(12) United States Patent
Kang

(10) Patent No.: US 11,836,701 B2
(45) Date of Patent: Dec. 5, 2023

(54) TERMINAL DEVICE AND METHOD OF OPERATING SAME

(71) Applicant: SK PLANET CO., LTD., Gyeonggi-do (KR)

(72) Inventor: Ki Chon Kang, Seoul (KR)

(73) Assignee: SK PLANET CO., LTD., Gyeonggi-do (KR)

( * ) Notice: Subject to any disclaimer, the term of this patent is extended or adjusted under 35 U.S.C. 154(b) by 235 days.

(21) Appl. No.: 16/502,185

(22) Filed: Jul. 3, 2019

(65) Prior Publication Data
US 2020/0013040 A1    Jan. 9, 2020

(30) Foreign Application Priority Data

Jul. 4, 2018  (KR) ...................... 10-2018-0077934

(51) Int. Cl.
| | | |
|---|---|---|
| *G06Q 20/32* | (2012.01) | |
| *H04W 4/80* | (2018.01) | |
| *G06F 21/40* | (2013.01) | |
| *H04L 9/40* | (2022.01) | |
| *G06F 21/32* | (2013.01) | |
| *H04W 12/64* | (2021.01) | |

(52) U.S. Cl.
CPC ......... *G06Q 20/3224* (2013.01); *G06F 21/32* (2013.01); *G06F 21/40* (2013.01); *G06Q 20/3278* (2013.01); *H04L 63/0846* (2013.01); *H04W 4/80* (2018.02); *H04W 12/64* (2021.01)

(58) Field of Classification Search
None
See application file for complete search history.

(56) References Cited

U.S. PATENT DOCUMENTS

| | | | | |
|---|---|---|---|---|
| 7,487,112 | B2* | 2/2009 | Barnes, Jr. ............... | H04W 4/18 705/26.8 |
| 7,865,937 | B1* | 1/2011 | White ................. | H04L 63/0838 726/2 |
| 9,489,787 | B1* | 11/2016 | Ives-Halperin ........ | G06Q 10/02 |
| 10,587,595 | B1* | 3/2020 | Naef ....................... | H04L 9/006 |

(Continued)

FOREIGN PATENT DOCUMENTS

| | | |
|---|---|---|
| KR | 10-2014-0077127 | 6/2014 |
| KR | 10-2014-0148161 | 12/2014 |

(Continued)

OTHER PUBLICATIONS

M. Portnoi and C.-C. Shen, "Loc-Auth: Location-enabled authentication through attribute-based encryption," 2015 International Conference on Computing, Networking and Communications (ICNC), Garden Grove, CA, USA, 2015, pp. 89-93, doi: 10.1109/ICCNC. 2015.7069321. (Year: 2015).*

(Continued)

*Primary Examiner* — Daniel S Felten
*Assistant Examiner* — Claire A Rutiser
(74) *Attorney, Agent, or Firm* — KED & ASSOCIATES, LLP

(57) ABSTRACT

Disclosed are a terminal device and a method of operating the same capable of, when a user enters a safe area (for example, the user's home or car), automatically executing a login to a site pre-configured in the entered area, thereby improving the use of an app service in the terminal device.

12 Claims, 7 Drawing Sheets

(56) References Cited

U.S. PATENT DOCUMENTS

| | | | | |
|---|---|---|---|---|
| 2002/0023215 | A1* | 2/2002 | Wang | G06Q 20/00 713/171 |
| 2005/0278547 | A1* | 12/2005 | Hyndman | G06Q 20/4014 713/185 |
| 2005/0285716 | A1* | 12/2005 | Denison | G06Q 20/18 340/5.2 |
| 2011/0035604 | A1* | 2/2011 | Habraken | G06F 21/34 713/193 |
| 2011/0222466 | A1* | 9/2011 | Pance | H04Q 3/0029 370/316 |
| 2011/0238517 | A1* | 9/2011 | Ramalingam | G06Q 20/40 705/26.1 |
| 2011/0296513 | A1* | 12/2011 | Kasad | H04L 63/107 726/9 |
| 2011/0320347 | A1* | 12/2011 | Tumminaro | G06Q 20/322 705/39 |
| 2012/0022902 | A1* | 1/2012 | Gressel | H04L 63/108 705/5 |
| 2012/0036071 | A1* | 2/2012 | Fulton | G06Q 20/4016 705/44 |
| 2013/0035063 | A1* | 2/2013 | Fisk | H04W 4/029 455/410 |
| 2014/0157353 | A1* | 6/2014 | Shim | H04L 63/20 726/1 |
| 2014/0282877 | A1* | 9/2014 | Mahaffey | H04W 12/33 726/3 |
| 2015/0121464 | A1* | 4/2015 | Hughes, Jr. | G06F 21/31 726/4 |
| 2015/0161585 | A1* | 6/2015 | Huster | G06Q 20/322 705/44 |
| 2015/0256471 | A1* | 9/2015 | Shin | H04W 4/80 455/41.2 |
| 2015/0271674 | A1* | 9/2015 | Huh | H04W 4/80 726/3 |
| 2015/0271676 | A1* | 9/2015 | Shin | H04W 12/06 713/168 |
| 2015/0324186 | A1* | 11/2015 | Shin | G06F 8/71 717/170 |
| 2015/0347734 | A1* | 12/2015 | Beigi | G06F 21/32 713/155 |
| 2015/0350189 | A1* | 12/2015 | Shin | H04W 40/244 726/29 |
| 2015/0358333 | A1* | 12/2015 | Cronin | H04L 63/0861 726/7 |
| 2016/0133073 | A1* | 5/2016 | Smith | G06Q 20/00 235/382 |
| 2016/0142497 | A1* | 5/2016 | Ullrich | H04W 4/33 715/738 |
| 2016/0277396 | A1* | 9/2016 | Gardiner | G06V 10/95 |
| 2017/0126818 | A1* | 5/2017 | Kang | H04L 67/62 |
| 2017/0188188 | A1* | 6/2017 | Kang | H04W 4/30 |
| 2018/0077546 | A1* | 3/2018 | Arunachalam | H04W 4/90 |
| 2018/0089971 | A1* | 3/2018 | Campero | G07C 9/00182 |
| 2018/0220309 | A1* | 8/2018 | Gomes | G05D 1/0022 |
| 2019/0279450 | A1* | 9/2019 | Kusens | G07C 9/00309 |

FOREIGN PATENT DOCUMENTS

| | | | | |
|---|---|---|---|---|
| KR | 10-2015-0134806 | | 12/2015 | |
| KR | 1860515 B1 | * | 5/2018 | H04W 48/02 |

OTHER PUBLICATIONS

Korean Office Action dated May 1, 2023 issued in Application No. 10-2018-0077934.

Korean Office Action dated Feb. 1, 2023 issued in Application No. 10-2018-0077934.

* cited by examiner

TERMINAL DEVICE AND METHOD OF OPERATING SAME

CROSS-REFERENCE TO RELATED APPLICATIONS

This application is based upon and claims the benefit of priority from Korean Patent Application No. 10-2018-0077934, filed on Jul. 4, 2018, the entire contents of which are incorporated herein by reference.

BACKGROUND OF THE INVENTION

1. Field of the Invention

The present disclosure relates to a method of automatically performing a login to a service pre-configured in a specific area (for example, the user's home or car) when a user enters the specific area.

2. Description of the Prior Art

Recently, many users possess terminal devices (for example, smart phones) capable of using various communication services during movement. Many services, which can be used through fixed devices such as PCs, are being gradually developed to be used through terminal devices.

Accordingly, users of terminal devices are required to install various types of applications (hereinafter, referred to as apps) through which terminal devices can access a site providing a service and use the corresponding service.

When the user desires to use a specific service, the user should search for and execute an app of the corresponding service in the user's own terminal device and then perform a login function by inputting information (for example, an ID and a password) for authentication.

That is, in an environment in which the terminal device uses an app, the use of the app service is hindered in that the user should search for and execute a desired app in the terminal device of the user every time and in that the user should directly perform a login function.

Recently, some apps have appeared in which, if the user performs the login function once, the login state is maintained according to selection. However such apps are highly likely to have security issues due to exposure of information (for example, an ID and a password) for maintaining the login state. In addition, the problem that the user should search for and execute the app in the terminal device of the user every time cannot be solved.

Meanwhile, when the user is located in a specific area such as home, an office and a car, service (site) types which the user mainly uses are limited.

Accordingly, the present disclosure proposes a new method of solving all of the factors that hinder the use of app services while being free from the security problem based on the information that services (sites) which the user mainly uses in a specific area (for example, home or a car) are limited.

SUMMARY OF THE INVENTION

The present disclosure has been made in order to solve the above-mentioned problems in the prior art and an aspect of the present disclosure is to, when a user enters a predetermined specific area (for example, the user's home or car), automatically perform a login to a service pre-configured in the entered specific area.

In accordance with an aspect of the present disclosure, a terminal device is provided. The terminal device includes: a recognition unit configured to recognize whether the terminal device enters into a predetermined specific area; an identification unit configured to identify a security level of the specific area into which the entry is recognized based on at least one of the specific area and a recognition scheme identified when the entry is recognized; and an automatic execution unit configured to automatically perform a specific function for service preset in the specific area according to the identified security level.

Specifically, the recognition unit may recognize entry into the specific area when a connection to a specific communication device installed in a specific area is made through short-range wireless communication based on authentication, or when a security device mapped to the specific area is unlocked by at least one of input of password, use of a security key, and recognition of biometric information.

Specifically, the recognition unit may receive information that the security device is unlocked from a communication device installed in the specific area and, when information that the security device is unlocked is identified through interworking with the security device, the communication device may transmit the information that the security device is unlocked to a terminal making a connection through short-range wireless communication within a preset time range from the time point at which the information is identified.

Specifically, the identification unit may identify the security level of the specific area based on a security level pre-configured for each area.

Specifically, the identification unit may identify a security level for a recognition scheme identified when entry into the specific area is recognized based on a security level for each recognition scheme pre-configured in each area.

Specifically, a recognition scheme identified when the entry may be recognized as the security device mapped to the specific area is unlocked is one of a password input recognition scheme, a security key use recognition scheme, and a biometric information recognition scheme, and the security level of the biometric information recognition scheme may be highest and the security level of the security key use recognition scheme may be equal to or higher than that of the password input recognition scheme.

Specifically, the automatic execution unit may automatically perform a function of the login to the service by executing an application for using the service pre-configured in the specific area and selectively perform a payment processing function according to the identified security level when payment is to be performed in the service.

In accordance with another aspect of the present disclosure, a method of operating a terminal device is provided. The method includes: a recognition step of recognizing whether the terminal device enters into a predetermined specific area; an identification step of identifying a security level of the specific area into which the entry is recognized based on at least one of the specific area and a recognition scheme identified when the entry is recognized; and an automatic execution step of automatically performing a specific function for a service preset in the specific area according to the identified security level.

Specifically, the recognition step may include recognizing entry into the specific area, when a connection to a specific communication device installed in a specific area is made through short-range wireless communication based on authentication, or when a security device mapped to the specific area is unlocked by at least one of input of password, use of a security key, and recognition of a biometric information.

Specifically, the identification step may include identifying the security level for a recognition scheme identified when entry into the specific area is recognized based on a security level for each recognition scheme pre-configured in each area.

Specifically, a recognition scheme identified when the entry may be recognized as the security device mapped to the specific area is unlocked is one of a password input recognition scheme, a security key use recognition scheme, and a biometric information recognition scheme, and the security level of the biometric information recognition scheme may be highest and the security level of the security key use recognition scheme may be equal to or higher than that of the password input recognition scheme.

Specifically, the automatic execution step may include automatically performing a function of the login to the service by executing an application for using the service pre-configured in the specific area and selectively performing a payment processing function according to the identified security level when payment is to be performed in the service.

According to a terminal device and a method of operating the same according to an embodiment of the present disclosure, an effect of improving the use of an app service in the terminal device while being free from the security problem can be derived by automatically performing a login to a service pre-configured in the entered area when a user enters a safe area (for example, the user's home or car).

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
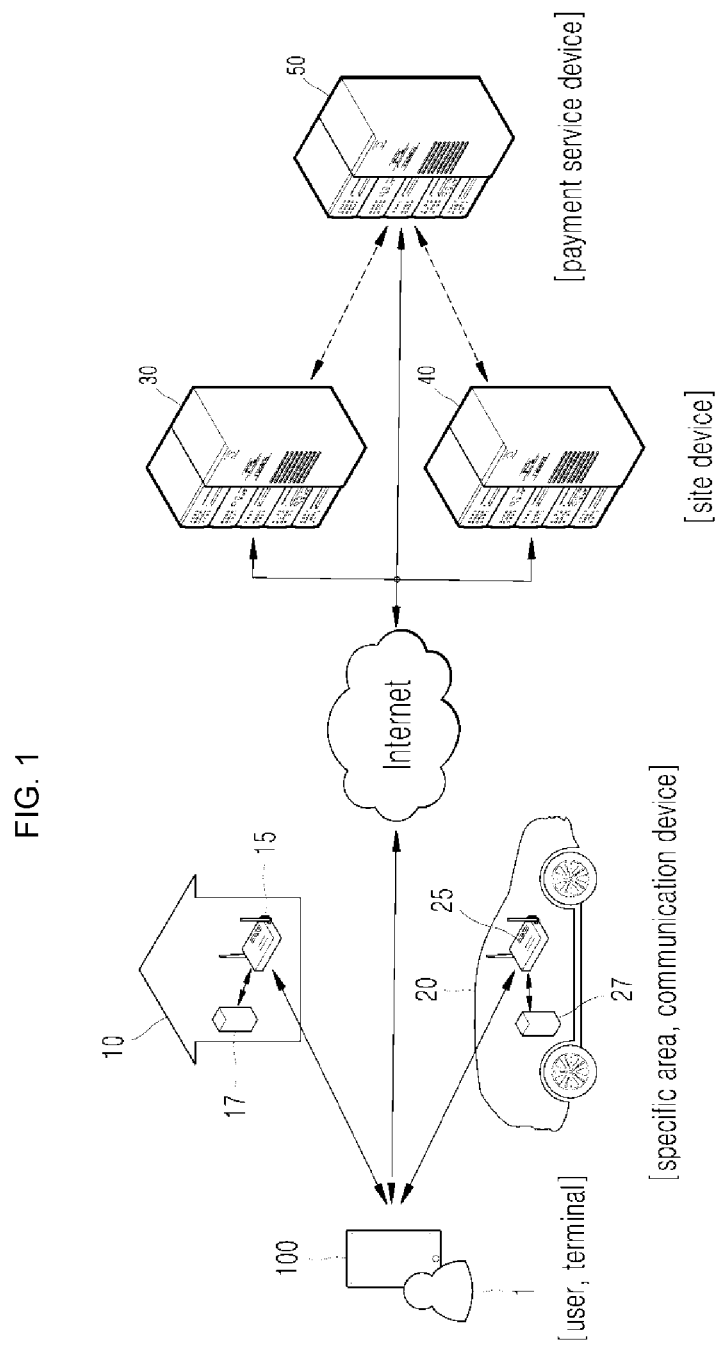
FIG. 1 schematically illustrates an app service system according to an embodiment of the present disclosure.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

Hereinafter, exemplary embodiments of the present disclosure will be described in detail with reference to the accompanying drawings, equal or similar elements are assigned an equal reference numeral, and an overlapping description thereof will be omitted. Further, in the following description of the present disclosure, a detailed description of known technologies incorporated herein will be omitted when it may make the subject matter of the present disclosure rather unclear. Further, it should be noted that the accompanying drawings are intended only for the easy understanding of the technical idea of the present disclosure, and the spirit of the present disclosure should not be construed as being limited by the accompanying drawings. In addition to the accompanying drawings, the spirit of the present disclosure should be construed to cover all modifications, equivalents, and alternatives thereof.

Hereinafter, an embodiment of the present disclosure will be described with reference to the accompanying drawings.

FIG. 1 illustrates an app service system according to an embodiment of the present disclosure.

As illustrated in FIG. 1, the app service system according to an embodiment of the present disclosure may include a terminal device 100 possessed by a user 1, predetermined specific areas 10 and 20, and site devices 30 and 40 configured to provide services (sites) available to the terminal device 100.

Further, the app service system according to an embodiment of the present disclosure may further include a payment service device 50 configured to provide a payment processing service such as authentication and approval of payment requested on online, and the payment service device 50 may provide the payment processing service through a direct link to the terminal device 100 or an indirect link to the site device 30 or 40 when payment processing related to the terminal device 100 is performed.

The payment service device 50 may be implemented in the form of, for example, a web server, a database server, or a proxy server, or may be implemented as a computerized system through installation of one or more of various pieces of software that allow a network load distribution mechanism or the service device to operate over the Internet or another network. Further, the network may be an http network, a private line, an intranet, or another network, and a connection between elements within the app service system according to an embodiment of the present disclosure may be made through a security network to prevent data from being compromised by an arbitrary hacker or a third party.

Specific areas 10 and 20 may be at least one area which can be changed/designated by the user 1 as secure areas, and may include, for example, a home, an office, or the user's own car.

FIG. 1 illustrates an embodiment in which two specific areas are designated by the user 1 in which it is assumed that the specific area 10 is a home and the specific area 20 is a car. The specific area 10 is interchangeable with the home 10 and the specific area 20 is interchangeable with the car 20.

Further, in the app service system according to an embodiment of the present disclosure, at least one communication device supporting short-range wireless communication may be installed in the specific areas 10 and 20. For example, as illustrated in FIG. 1, a communication device 15 (modem device) supporting Wi-Fi may be installed in the home 10 and a communication device 25 (Bluetooth device) supporting Bluetooth may be installed in the car 20. Of course, the communication device 25 (modem device) supporting Wi-Fi may be installed in the car 20.

Further, in the app service system according to an embodiment of the present disclosure, security devices mapped to the specific areas 10 and 20 may be installed. For example, as illustrated in FIG. 1, a door lock 17 which is the security device may be installed in (mapped to) the home 10 and a starting device 27, which is the security device, may be installed in (mapped to) the car 20.

The terminal device 100 is a device which the user 1 can held and use various communication services during moving and may include, for example, a smart phone, a portable terminal, a mobile terminal, a Personal Digital Assistant (PDA), a Portable Multimedia Player (PMP) terminal, a telematics terminal.

Particularly, it is preferable to install various types of applications (hereinafter, referred to as apps) through which the terminal device 100 can access a site that provides a service, which the user 1 desires to use, and can use the corresponding device.

When the user 1 desires to use a specific service (for example, a home-shopping service), the user 1 may search for and execute an app of the corresponding service in the owner's own terminal device 100, access the site device 30 (home-shopping server) that provides the corresponding to service (site) based on the app, and directly input information (for example, an ID and a password) for authentication in the type supported by the site device 30 (home-shopping server) to perform a login function, thereby accessing the corresponding home-shopping site and using the home-shopping service.

That is, in an environment in which the terminal device uses an app, the use of the app service is hindered in that the user 1 should search for and execute a desired app among many types of apps pre-installed in the terminal device 100 of the user every time and in that the user 1 should directly perform a login function.

Of course, recently, some apps in which a login state is maintained according to a selection after the user performs the login function once have appeared, but have problems which cannot be improved in that there is a high probability of a security issue due to exposure of information (for example, an ID or a password) for maintaining the login state and the user is required to search for and execute an app which the user desires every time in the terminal device.

Meanwhile, since the user has personal tastes and life patterns, if the user is located in an area such as home or an office where the user is present at a specific time or such as a car where the user stays for a specific purpose, service (site) types which the user mainly uses are limited.

For example, the user frequently uses the home-shopping service while taking a rest at home, but rarely uses the home-shopping service while staying at the office.

Further, the user frequently uses a traffic information service while staying in and driving the car, but rarely uses the traffic information service while staying at home.

As described above, the services (sites) which the user mainly uses in a specific area (for example, a home or in a car) is limited.

Accordingly, the present disclosure proposes a new method of solving all factors that interrupt the use of the app service while being free from the security problem based on that the services (sites) which the user mainly uses in a specific area (for example, a home or a car) are limited.

Specifically, the present disclosure proposes a method of, when the user enters a predetermined specific area (for example, the user's home or car) which is a secure area, automatically performing a login to a site pre-configured in the entered area.

Hereinafter, the configuration of the terminal device 100 for implementing the method which the present disclosure proposes will be described in more detail.

Figure 2:
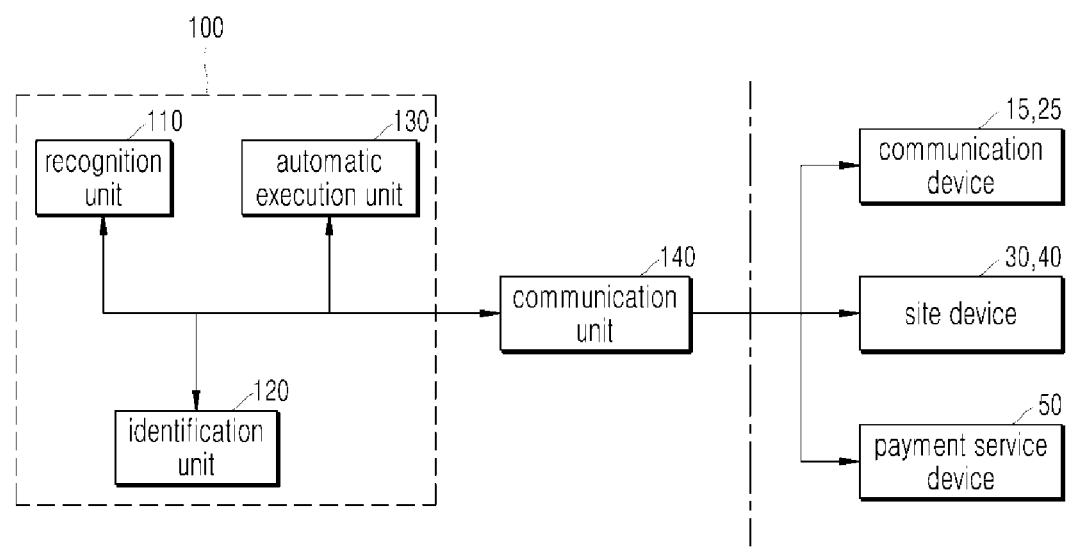
FIG. 2 schematically illustrates a terminal device according to an embodiment of the present disclosure.

FIG. 2 illustrates the configuration of the terminal device 100 according to an embodiment of the present disclosure.

As illustrated in FIG. 2, the terminal device 100 according to an embodiment of the present disclosure may include a recognition unit 110 configured to recognize whether the user enters a predetermined specific area, an identification unit 120 configured to identify a security level of the recognized entered specific area, and an automatic execution unit 130 configured to automatically execute a specific function according to the identified security level.

All or at least some of the elements of the terminal device 100 including the recognition unit 110, the identification unit 120, and the automatic execution unit 130 may be implemented in the form of a software module or a hardware module executed by a processor, or a combination of a software module and a hardware module.

Meanwhile, the terminal device 100 according to an embodiment of the present disclosure may further include a communication unit 140 for communication with the communication devices 15 and 25, the site devices 30 and 40, and the payment service device 50 as well as the above-described elements.

For reference, since the configuration of the communication unit 140 is the configuration corresponding to a communication unit 2310 to be described with reference to FIG. 3, a detailed description thereof will be made below.

As a result, when the user enters a predetermined specific area (for example, the user's home or car) which is a secure area based on the above-described configuration, the terminal device 100 according to an embodiment of the present disclosure may automatically perform a login to a site pre-configured in the entered area.

Hereinafter, elements within the terminal device 100 for implementing it will be described in more detail.

The recognition unit 110 serves to recognize whether the user enters a predetermined specific area.

Here, the specific area is at least one area which can be changed/designated by the user 1 who possesses/holds the terminal device 100, may be considered as a secure area, and may include, for example, the user's home, office, or car.

Hereinafter, for convenience of description, two specific areas 10 and 20 are designated by the user 1 and it is assumed that the specific area 10 is the user's home and the specific area 20 is the user's car as illustrated in FIG. 1. The specific area 10 is interchangeable with the home 10 and the specific area 20 is interchangeable with the car 20.

Specifically, the recognition unit 110 serves to recognize whether the terminal device 100 enters one of the predetermined specific areas 10 and 20.

At this time, it may safely be said that the user 1 always holds the terminal device 100, so the recognition unit 110 recognizes whether the user 1 enters one of the predetermined specific areas 10 and 20.

Hereinafter, a method of recognizing whether the user enters the specific area will be described in detail.

First, according to a first embodiment, when authentication-based short-range wireless communication is connected to a specific communication device installed in a specific area, the recognition unit 110 may recognize entrance to the specific area.

As described above with reference to FIG. 1, the communication device supporting authentication-based short-range wireless communication may be installed in each of the specific areas 10 and 20 and, for example, the communication device 15 (modem device) supporting Wi-Fi may be installed in the home 10.

When the terminal device 100 performs an authentication procedure using a Wi-Fi access password assigned to the communication device 15 (modem device) and then enters a Wi-Fi range of the communication device 15 (modem device), the Wi-Fi connection with the communication device 15 (modem device) is made through automatic authentication using the Wi-Fi access password.

Accordingly, when the user 1 who possesses/holds the terminal device 100 enters the home 10 within the Wi-Fi range of the communication device 15 (modem device), the terminal device 100 makes the authentication-based Wi-Fi connection with the communication device 15 (modem device) through automatic authentication using the Wi-Fi access password.

Further, the recognition unit 110 may pre-store device information of the communication devices 15 and 25 installed in the specific areas 10 and 20.

Accordingly, when the authentication-based Wi-Fi connection with the communication device 15 (modem device) installed in the home 10 is made based on device information, the recognition unit 110 may recognize entrance into the home 10.

Meanwhile, according to a second embodiment, when information that the security device mapped to the specific area is unlocked by at least one of input of the password, use of a security key, and recognition of a user's body is received, the recognition unit 110 may recognize entrance into the specific area.

As described above with reference to FIG. 1, the mapped security device may be prepared in each of the specific areas 10 and 20. For example, the door lock 17 may be prepared in (mapped to) the home 10 as the security device and the starting device 27 may be prepared in (mapped to) the car 20 as the security device.

Further, according to the second embodiment, the communication device linked to the security device prepared in the corresponding specific area may be installed in each of the specific areas 10 and 20.

In the description in which the specific area corresponds to the home 10, a home network in which the user 1 can remotely control home devices (including the door lock) through the terminal device 100 based on the communication device 15 (modem device) linked to various home devices (for example, a refrigerator, an air conditioner, and a heater) including the door lock 17 may be configured in the home 10.

In this case, the communication device 15 (modem device) installed in the home 10 may identify information that the door lock 17 is unlocked through the link with the door lock 17.

Of course, even though the home network is not configured in the home 10, the communication device 15 (modem device) installed in the home 10 may identify the information that the door lock 17 is unlocked through the link with the door lock 17.

At this time, when identifying the information that the door lock 17 is unlocked through the link with the door lock 17, the communication device 15 (modem device) may also identify whether the door lock 17 is unlocked by input of the password, use of the security key (for example, a door lock key), or recognition of a user's body (for example, a fingerprint or pupil).

When the communication device 15 (modem device) installed in the home 10 identifies the information that the door lock 17 is unlocked, the communication device 15 may transmit the information that the security device, that is, the door lock 17 is unlocked to a terminal connected through short-range wireless communication (Wi-Fi) within a preset time range among terminals in a terminal list related to the corresponding specific area, that is, the home 10 based on the time point at which the information is identified.

At this time, it is preferable that the preset time range is set as a time required for mutually connecting the terminal device 100, which the user 1 who has unlocked the door lock 17 and entered the home 10 possesses/holds, and the communication device 15 (modem device).

The terminal list related to the home 10 may include terminals having a history of the Wi-Fi connection with the communication device 15 (modem device) through the authentication procedure using the Wi-Fi access password assigned to the communication device 15 (modem device).

Accordingly, the terminals in the terminal list related to the home 10 are terminals of authenticated users as family members residing in the home 10.

When the communication device 15 (modem device) identifies information that the door lock 17 is unlocked, the communication device 15 transmits the information that the door lock 17 is unlocked to a terminal having the Wi-Fi connection within the preset time range among terminals of family members in the terminal list related to the home 10 based on the time point at which the information is identified.

At this time, it is preferable that a signal transmitted by the communication device 15 (modem device) includes information on whether the door lock 17 is unlocked by input of the password, use of the security key (for example, the door lock key), or recognition of the user's body (for example, the fingerprint or pupil).

When receiving, from the communication device 15 (modem device), the information that the security device, that is, the door lock 17 prepared in (mapped to) the specific area, that is, the home 10 is unlocked, the recognition unit 110 may recognize entrance into the home 10.

Further, in the description in which the specific area corresponds to the car 20, a connected car technology by which the user 1 can control car devices (including the starting device) through the terminal device 100 based on an Electronic Control Unit (ECU) linked to various car devices (for example, the communication device 25, an exhaust device, and a speed device) including the starting device 27 may be used for the car 20.

In this case, the communication device 25 installed in the car 20 may identify the information that the starting device 27 is started and thus unlocked through a direct link with the starting device 27 or an indirect link therewith through the ECU.

Of course, even though the connected car technology is not used for the car 20, the communication device 25 installed in the car 20 may identify the information that the starting device 27 is started and thus unlocked through the link with the starting device 27.

At this time, when identifying the information that the starting device 27 is started and thus unlocked, the communication device 25 may also identify whether the starting device 27 is unlocked by input of the password, use of the security key (for example, a car key), or recognition of the user's body (for example, the fingerprint or pupil).

When the communication device 25 installed in the car 20 identifies the information that the starting device 27 is unlocked, the communication device 25 may transmit the information that the security device, that is, the starting device 27 is unlocked to a terminal connected through short-range wireless communication (for example, Bluetooth) within a preset time range among terminals in the terminal list related to the corresponding specific area, that is, the car 20 based on the time point at which the information is identified.

At this time, it is preferable that the preset time range is set as a time required for mutually connecting the terminal device 100, which the user 1 who has unlocked the starting device 27 and entered the car 20 possesses/holds, and the communication device 25.

The terminal list related to the car 20 may include terminals having a history of the Bluetooth connection with the communication device 25.

Accordingly, the terminals in the terminal list related to the car 20 are terminals of authenticated users as car sharing members using the car 20.

When identifying the information that the starting device 27 is unlocked, the communication device 25 transmits the information that the starting device 27 is unlocked to a terminal having the Bluetooth connection within the preset time range among terminals of the car sharing members in the terminal list related to the car 20 based on the time point at which the information is identified.

At this time, it is preferable that a signal transmitted by the communication device 25 includes information on whether the starting device 27 is unlocked by input of the password, use of the security key (for example, the car key), or recognition of the user's body (for example, the fingerprint or pupil).

When receiving the information that the security device, that is, the starting device 27 prepared in (mapped to) the specific area, that is, the car 20 is unlocked from the communication device 25 (Bluetooth device) installed in the car 20, the recognition unit 110 may recognize entrance into the car 20.

The identification unit 120 serves to identify a security level of the recognized entered specific area based on at least one of the specific area and a recognition scheme identified when the entrance is recognized.

That is, when the recognition unit 110 recognizes entrance into the home 10, the identification unit 120 identifies the security level of the home 10 based on at least one of the home 10 and the recognition scheme identified when the entrance is recognized. When the recognition unit 110 recognizes entrance into the car 20, the identification unit 120 identifies the security level of the car 20 based on at least one of the car 20 and the recognition scheme identified when the entrance is recognized.

Hereinafter, a scheme for identifying the security level of the specific area will be described in detail.

First, according to the first embodiment, the identification unit 120 may identify a security level configured in the recognized entered specific area based on a security level pre-configured in each specific area.

As described above, in the description in which the home 10 and the car 20 are examples of the specific area, it is preferable that the identification unit 120 may manage the security level pre-configured for each of the home 10 and the car 20 and the security level can be changed/set by the user 1.

For example, the home 10 may be set to have a relatively higher security level H and the car 20 may be set to have a security level L.

When the recognition unit 110 recognizes entrance into the home 10, the identification unit 120 may identify the security level H configured in the home 10 based on the security level pre-configured for each specific area.

Further, when the recognition unit 110 recognizes entrance into the car 20, the identification unit 120 may identify the security level L configured in the car 20 based on the security level pre-configured for each specific area.

Meanwhile, according to the second embodiment, the identification unit 120 may identify the security level configured in the recognition scheme identified when entrance into the recognized entered specific area is identified based on the security level for each recognition scheme pre-configured for each specific area.

At this time, the authentication scheme identified when the entrance is recognized according to unlocking of the security device mapped to the specific area may be one of a password input recognition scheme, a security key using recognition scheme, and a biometric information recognition scheme.

Further, it is preferable that the security level for each recognition scheme is set such that the security level of the biometric information recognition scheme is highest and the security level of the security key using recognition scheme is higher than or equal to the security level of the password input recognition scheme.

As described above, in the description in which the home 10 and the car 20 are examples of the specific area, it is preferable that the identification unit 120 manages the security level for each recognition scheme pre-configured for each of the home 10 and the car 20, and the security level can be changed/set by the user 1.

For example, with respect to the home 10, the password input recognition scheme may be set to have a relatively lower security level L and the security key/biometric information recognition scheme may be set to have a relatively higher security level H.

Further, with respect to the car 20, the password/security key input recognition scheme may be set to have a relatively lower security level L and the biometric information recognition scheme may be set to have a relatively higher security level H.

As described above, when the recognition unit 110 receives information that the security device 17 or 27 is unlocked from the communication device 15 or 25 and recognizes entrance into the specific area 10 or 20, the recognition unit 110 may also recognize the authentication scheme by receiving information on whether the security device is unlocked by input of the password, use of the security key, or recognition of the user's body.

When the recognition unit 110 recognizes entrance into the home 10, the identification unit 120 may identify the security level L if the recognition scheme identified when the entrance is recognized is the password input recognition scheme and may identify the security level H if the recognition scheme identified when the entrance is recognized is the security key use or biometric information recognition scheme based the security level for each recognition scheme pre-configured for each specific area.

Further, when the recognition unit 110 recognizes entrance into the car 20, the identification unit 120 may identify the security level L if the recognition scheme identified when the entrance is recognized is the password input or security key recognition scheme and may identify the security level H if the recognition scheme identified when the entrance is recognized is the biometric information recognition scheme based the security level for each recognition scheme pre-configured for each specific area.

The automatic execution unit 130 serves to automatically execute a specific function according to the identified security level for the site pre-configured in the specific area.

As described above, in the description in which the home 10 and the car 20 are examples of the specific area, it is preferable that the automatic execution unit 130 may set/manage information related to at least one service (site) for each of the home 10 and the car 20, and the information related to the site for each of the home 10 and the car 20 can be changed/set by the user 1.

For example, information related to a home-shopping service (site) and a music-streaming service (site) may be configured in the home 10. More specifically, an app pre-installed to use the home-shopping service (site) and an app pre-installed to use the music-streaming service (site) may be configured.

Further, information related to a traffic information service (site) may be configured in the car 20. More specifically, an app pre-installed to use the traffic information service (site) may be configured.

When the recognition unit 110 recognizes entry into the specific area, for example, the home 10 and the identification unit 120 identifies the security level (for example, H or L), the automatic execution unit 130 may automatically perform a specific function according to the security level for the home-shopping service (site)/music-streaming service (site) pre-configured in the home 10.

Specifically, for example, when the recognition unit 110 recognizes entry into the specific area, for example, the home 10 and the identification unit 120 identifies the security level (for example, H or L), the automatic execution unit 130 may execute each of the apps pre-installed to use the home-shopping service (site)/music-streaming service (site) pre-configured in the home 10 to automatically perform a function of the login to the home-shopping service (site)/music-streaming service (site).

That is, when the user 1 possessing/holding the terminal device 100 enters the home 10 designated as the safe area, the automatic execution unit 130 may automatically perform the login function by executing each of the home-shopping service (site)/music-streaming service (site) and thus automatically log in all services (sites) which the user 1 mainly uses in the home 10.

To this end, it is preferable that the automatic execution unit 130 separately configures/manages information related to services (sites) for specific areas 10 and 20 and maps/stores each of pieces of information required for logging in the corresponding sites.

Further, the automatic execution unit 130 may selectively automatically perform more functions in the home-shopping service (site)/music-streaming service (site) according to the identified security level (for example, H or L).

For example, when the security level identified by the identification unit 120 is L, the automatic execution unit 130 may automatically perform only the login function as the specific function.

Meanwhile, when the security level identified by the identification unit 120 is H, the automatic execution unit 130 may also automatically perform, as the specific function, a payment processing function when payment is performed in the home-shopping service (site)/music-streaming service (site) which the terminal device 100 logs into/accesses.

That is, when the user 1 possessing/holding the terminal device 100 enters the home 10 designated as the safe area and the security level is H, the automatic execution unit 130 not only automatically logs into the service (site) mainly used in the home 10, for example, the home-shopping service (site)/music-streaming service (site) but also automatically perform the payment processing function when payment is performed according to selection of payment in the corresponding site, so as to perform payment processing such as authentication and payment approval through a direct/indirect link to the payment service device 50 without an additional process of authentication and/or personal payment information input.

To this end, it is preferable that the automatic execution unit 130 not only separately configures/manages information related to services (sites) for specific areas 10 and 20 and but also maps/stores each of pieces of information required for payment in the corresponding sites.

Meanwhile, each element within the terminal device 100 may be implemented in the form of a software module or a hardware module executed by the processor in the form of a combination of a software module and a hardware module.

As described above, the software module and the hardware module executed by the processor, and the combination of the software module and the hardware module may be implemented by a hardware system (for example, a computer system).

Accordingly, hereinafter, a hardware system 2000 in which the terminal device 100 according to an embodiment of the present disclosure is implemented in the hardware form will be described with reference to FIG. 3.

For reference, the following description is an example of the hardware system 2000 in which each element within the terminal device 100 is implemented and it should be noted that each element and the operation thereof may be different from those of the actual system.

Figure 3:
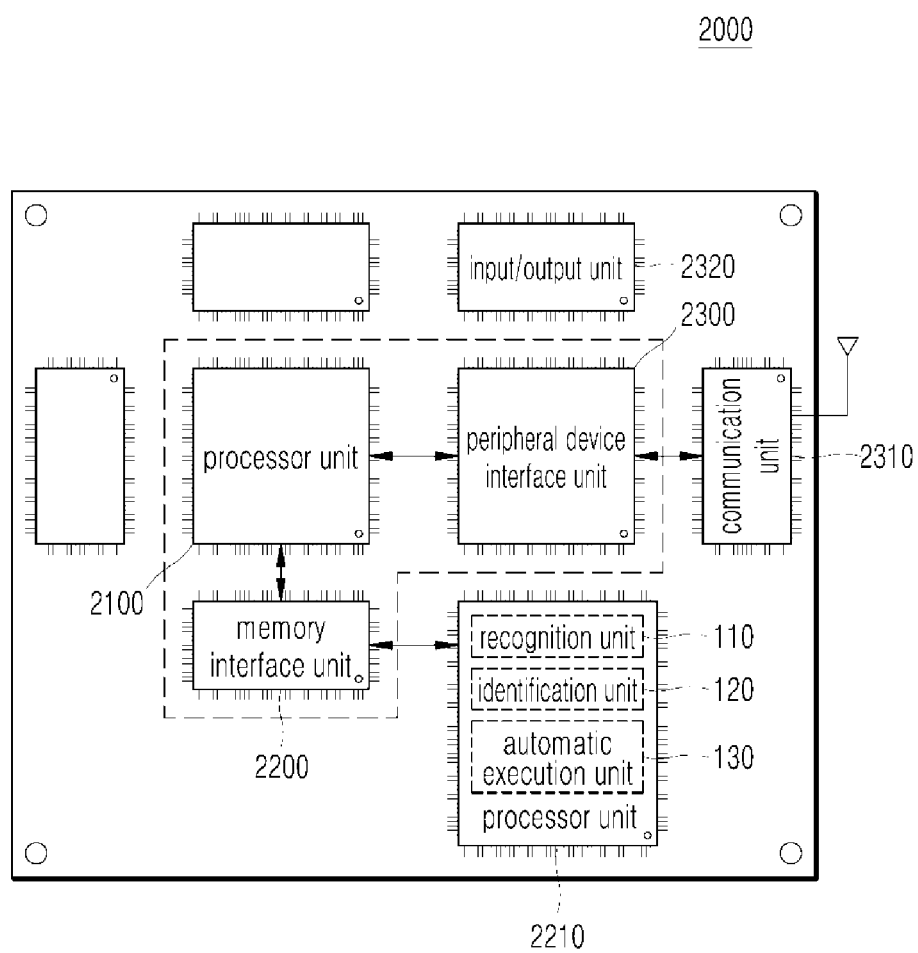
FIG. 3 illustrates a hardware system for implementing the terminal device according to an embodiment of the present disclosure.

As illustrated in FIG. 3, the hardware system 2000 according to an embodiment of the present disclosure may include a processor unit 2100, a memory interface unit 2200, and a peripheral device interface unit 2300.

The respective elements within the hardware system 2000 may be individual elements, or may be integrated into one or more integrated circuits, and may be combined by a bus system (not shown).

The bus system is an abstraction indicating one or more individual physical buses, communication lines/interfaces, multi-drop, and/or point-to-point connections connected by bridges, adaptors, and/or controllers as appropriate.

The processor unit 2100 may serve to execute various software modules stored in the memory unit 2210 by communicating with the memory unit 2210 through the memory interface unit 2200 in order to perform various functions in the hardware system.

The memory unit 2210 may store the recognition unit 110, the identification unit 120, and the automatic execution unit 130, which are elements within the terminal device 100 described with reference to FIG. 2 in the software module form and may further store an Operating System (OS).

The operating system (for example, an embedded operating system such as iOS, Android, Darwin, RTXC, LINUX, UNIX, OSX, WINDOWS, or VxWorks) includes various procedures for controlling and managing general system tasks (for example, memory management, storage device control, and power management), an instruction set, a software component, and/or a driver, and serves to make communication between various hardware modules and software modules easy.

For reference, the memory unit 2210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a Compact Disk (CD), and a Digital Video Disc (DVD)).

The peripheral interface unit 2300 serves to enable communication between the processor unit 2100 and peripheral devices.

The peripheral device may provide different functions to the hardware system 2000 and may include, for example, a communication unit 2310 and an input/output unit 2320 according to an embodiment of the present disclosure.

The communication unit 2310 serves to provide a function of communication with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 2310 may include, for example, Wireless LAN (WLAN), Digital Living Network Alliance (DLNA), Wireless broadband (Wibro), World interoperability for microwave access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, and Wi-Fi Direct. Wired communication networks may include wired Local Area Network (LAN), wired Wide Area Network (WAN), Power Line Communication (PLC), USB communication, Ethernet, serial communication, and optical fiber/coaxial cable, but are not limited thereto and may include any protocol that can provide a communication environment with another device.

The input/output unit 2320 serves as a controller for controlling an I/O device linked to other hardware systems.

As a result, each element within the terminal device 100 stored in the memory unit 2210 of the hardware system 2000 according to an embodiment of the present disclosure in the software module form may execute an interface with the communication unit 2310 via the memory interface unit 2200 and the peripheral device interface unit 2300 in the form of instructions executed by the processor unit 2100, thereby automatically performing, when the user enters a specific area (for example, home or a car) as a safe area, a login to a site pre-configured in the entered area.

As described above, according to the present disclosure, when the user enters the safe area (for example, the home or the car), it is possible to derive an effect of improving the use of the app service in the terminal device by automatically performing the login to the site pre-configured in the entered area.

At this time, according to the present disclosure, as pieces of information required for automatically performing a login/payment function in the site are all managed within the terminal, it is possible to be free from the security problem.

Further, according to the present disclosure, it is possible to derive a remarkable effect of maximizing the use of the app service in the terminal device by not only automatically performing the login to the site pre-configured in the entered area but also additionally differentiating functions in the site according to security levels.

Hereinafter, an operation flow in the app service system according to an embodiment of the present disclosure will be subsequently described.

Figure 4:
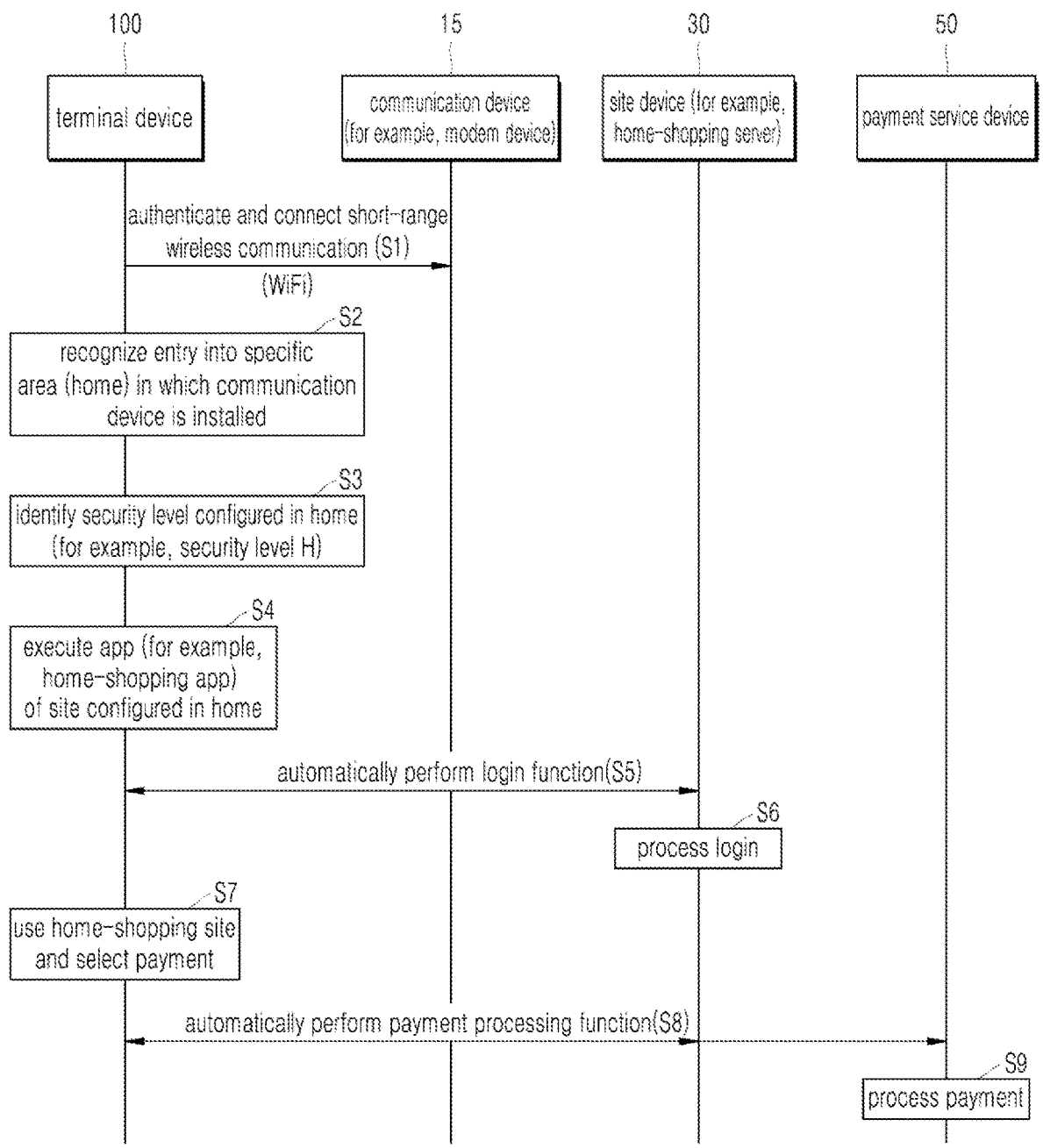
FIGS. 4 to 6 are flowcharts schematically illustrating the operation flow in the app service system according to various embodiments of the present disclosure.
Figure 5:
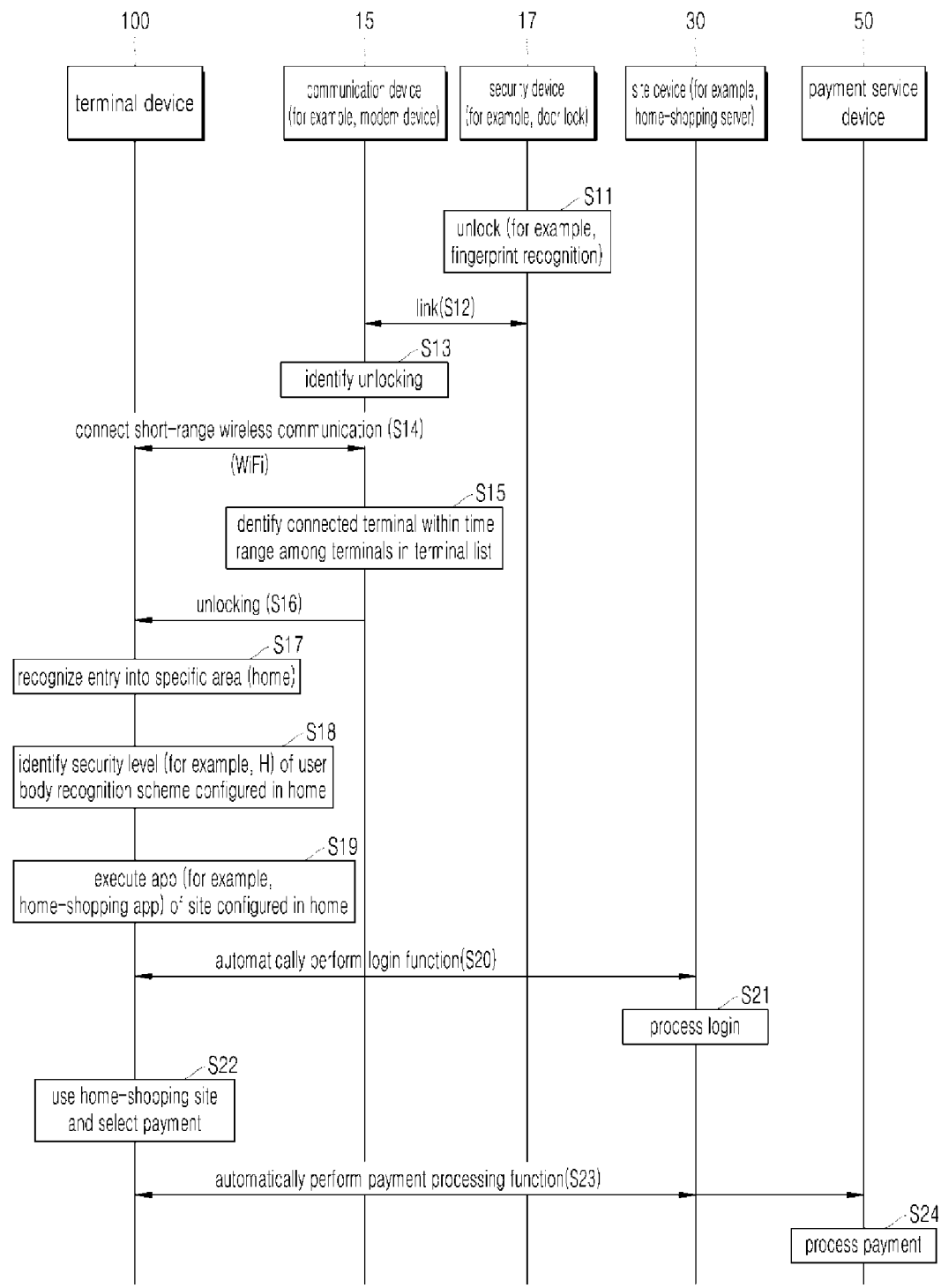
Figure 6:
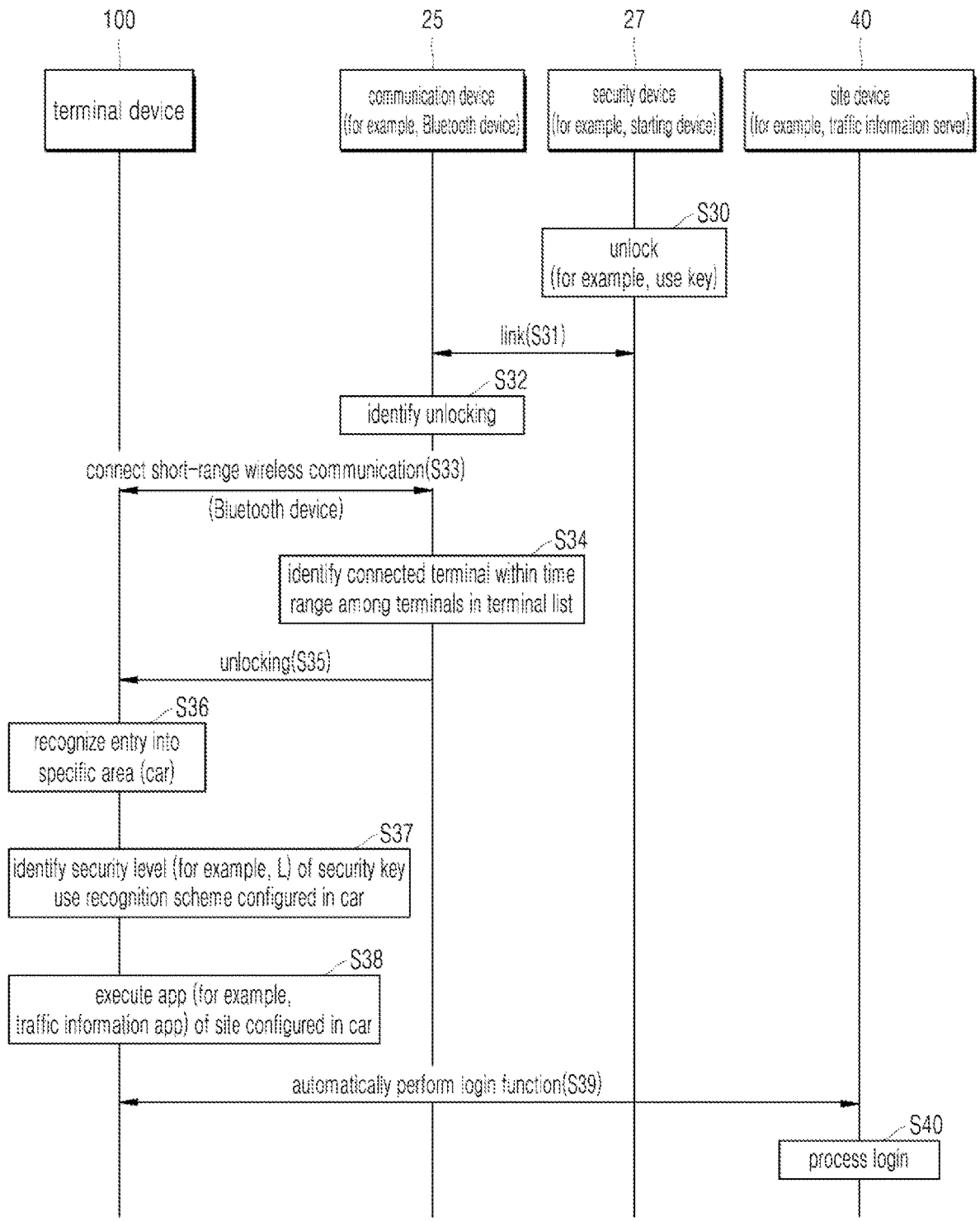

In connection with this, FIGS. 4 to 6 illustrate the operation flow in the app service system according to various embodiments of the present disclosure.

First, a first embodiment in which the user 1 possessing/holding the terminal device 100 enters the home 10 is described with reference to FIG. 4.

Prior to the description, it is assumed that the communication device 15 (modem device) supporting Wi-Fi is installed in the home 10.

When an authentication procedure using a Wi-Fi access password, which was assigned to the communication device 15 (modem device) in the past, is performed and then the terminal device 100 enters a Wi-Fi range of the communication device 15 (modem device), the terminal device 100 is connected to the communication device 15 (modem device) through Wi-Fi by automatic authentication using the Wi-Fi access password.

Accordingly, when the user 1 possessing/holding the terminal device 100 enters the Wi-Fi range of the communication device 15 (modem device), that is, the home 10, the terminal device 100 is connected to the communication device 15 (modem device) through authentication-based Wi-Fi by automatic authentication using the Wi-Fi access password in S1.

When the terminal device 100 is connected to the communication device 15 (modem device) installed in the home 10 through authentication-based Wi-Fi based on device information of the communication devices 15 and 25 installed in specific areas 10 and 20, respectively, entry into the home 10 may be recognized in S2.

When the entry into the home 10 is recognized, the terminal device 100 may identify a security level (for example, H) configured in the home 10 based on a security level pre-configured for each specific area in S3.

When the entry into the home 10 is recognized and the security level (for example, H) is identified, the terminal device 100 executes an app of the site (service) pre-configured in the home 10 in S4.

Hereinafter, for convenience of description, it is assumed that an app of a home-shopping service (site) (hereinafter, referred to as a home-shopping app) is pre-configured in the home 10.

That is, when the entry into the home 10 and the security level (for example, H) are identified, the terminal device 100 executes the home-shopping app pre-configured in the home 10 in S4.

The terminal device 100 may access the site device 30 (home-shopping server) that provides the corresponding home-shopping service (site) based on the home-shopping app and automatically perform a function of the login to the home-shopping service (site) in S5.

Then, the site server 30 (home-shopping server) may normally process the login for the user 1 according to the login function automatically performed by the terminal device 100 in S6.

Accordingly, the terminal device 100 may access the corresponding home-shopping site and use the home-shopping service while being in a login state and may select payment as necessary in S7.

In this case, since the security level identified in step S3 is H, the terminal device 100 may automatically perform a payment processing function when payment is selected and performed, and thus perform payment processing such as authentication and payment approval through a direct/indirect link to the payment service device 50 without an additional process of authentication and/or personal payment information input in S8 and S9.

Hereinafter, a second embodiment in which the user 1 possessing/holding the terminal device 100 enters the home 10 will be described with reference to FIG. 5.

Prior to the description, it is assumed that the communication device 15 (modem device) supporting Wi-Fi and the security device 17 (door lock) are installed in the home 10.

When the security device, that is, the door lock 17 is unlocked in S11 (for example, fingerprint recognition), the communication device 15 (modem device) may identify the information that the door lock 17 is unlocked through the link to the door lock 17 in S12 and S13.

The home 10 is described below as the specific area. In the home 10, a home network is configured in which the user 1 can remotely control home devices (including the door lock) through the terminal device 100 based on the communication device 15 (modem device) linking to various home devices (for example, a refrigerator, an air conditioner, and a heater) including the door lock 17.

In this case, the communication device 15 (modem device) installed in the home 10 may identify the information that the door lock 17 is unlocked through the link to the door lock 17.

Of course, even though the home network is not configured, the communication device 15 (modem device) installed in the home 10 may identify the information that the door lock 17 is unlocked through the link to the door lock 17.

At this time, when the communication device 15 (modem device) identifies the information that the door lock 17 is unlocked through the link to the door lock 17, the communication device 15 may also identify whether the door lock 17 is unlocked by input of a password, by the use of a security key (for example, a door lock key), or by recognition of a biometric information (for example, fingerprint or pupil).

Meanwhile, since the user 1 who unlocks the door lock 17 enters the home 10 while holding the terminal device 100, short-range wireless communication (Wi-Fi) is connected between the terminal device 100 and the communication device 15 (modem device) in S14.

When the communication device 15 (modem device) installed in the home 10 identifies the information that the door lock 17 is unlocked, the communication device 15 may identify a terminal connected to short-range wireless communication (Wi-Fi) within a preset time range from the time point of the identification among terminals in a terminal list related to the corresponding specific area, that is, the home 10 and transmit the information that the security device, that is, the door lock 17 is unlocked to the terminal in S15 and S16.

At this time, it is preferable that the preset time range is set as a time required for connecting the terminal device 100 possessed/held by the user 1 who unlocks the door lock 17 and enters the home 10 and the communication device 15 (modem device).

The terminal list related to the home 10 may include terminals which have been connected to the communication device 15 (modem device) through Wi-Fi after the authentication procedure using the Wi-Fi access password assigned to the communication device 15 (modem device).

Accordingly, the terminals in the terminal list related to the home 10 are terminals of users authenticated as family members residing in the home 10.

When the communication device 15 (modem device) identifies the information that the door lock 17 is unlocked, the communication device 15 transmits the information that the door lock 17 is unlocked to the terminal connected to Wi-Fi within the preset time range from the time point of identification among terminals of family members in the terminal list related to the home 10.

At this time, it is preferable that a signal transmitted by the communication device 15 (modem device) includes information on whether the door lock 17 is unlocked by input of a password, by the use of a security key (for example, a door lock key), or recognition of a biometric information (for example, fingerprint or pupil).

When the terminal device 100 receives the information that the security device, that is, the door lock 17 located in (mapped to) the specific area, that is, the home is unlocked from the communication device 15 (modem device) installed in the home 10, the terminal device 100 may recognize entry into the home 10 in S17.

When the entry into the home 10 is recognized, the terminal device 100 may identify a security level configured in a recognition scheme identified when the terminal device 100 enters the home 10 based on a security level for each recognition scheme pre-configured in each specific area in S18.

At this time, the recognition scheme identified when the entry is recognized according to unlocking of the security device mapped to the specific area may be one of a password input recognition scheme, a security key use recognition scheme, and a biometric information recognition scheme.

For example, with respect to the home 10, a relatively lower security level L is configured in the password input recognition scheme and a relatively higher security level H may be configured in the security key/biometric information recognition scheme.

As described above, when the terminal device 100 receives the information that the door lock 17 is unlocked from the communication device 15 and recognizes the entry into the home 10, the terminal device 100 may identify a recognition scheme by also receiving information on whether the door lock 17 is unlocked by input of a password, by the use of a security key, or by recognition of a biometric information.

Accordingly, when the entry into the home 10 is recognized, the terminal device 100 may identify the security level L when the recognition scheme, which is identified when the entry is recognized, is the password input recognition scheme and identify the security level H when the recognition scheme, which is identified when the entry is recognized, is the security key use or biometric information recognition scheme based on the security level for each recognition scheme pre-configured in each specific area in S18.

Hereinafter, it is assumed that the security device is unlocked by the finger recognition in step S11 and the security level H is identified in step S18.

When the entry into the home 10 is recognized and the security level (for example, H) is identified, the terminal device 100 executes an app of a site (service) pre-configured in the home 10 in S19.

Hereinafter, for convenience of description, it is assumed that an app of a home-shopping service (site) (hereinafter, referred to as a home-shopping app) is pre-configured in the home 10.

That is, when the entry into the home 10 and the security level (for example, H) are identified, the terminal device 100 executes the home-shopping service (site) pre-configured in the home 10 in S19.

The terminal device 100 may access the site device 30 (home-shopping server) that provides the corresponding home-shopping service (site) based on the home-shopping app and automatically perform a function of the login to the home-shopping service (site) in S20.

Then, the site device 30 (home-shopping server) may normally process the login for the user 1 according to the login function automatically performed by the terminal device 100 in S21.

Accordingly, the terminal device 100 may access the corresponding home-shopping site and use the home-shopping service while being in a login state and may select payment as necessary in S22.

In this case, since the security level identified in step S3 is H, the terminal device 100 may automatically perform a payment processing function when payment is selected and performed, and thus perform payment processing such as authentication and payment approval through a direct/indirect link to the payment service device 50 without an additional authentication and/or personal payment information input process in S23 and S24.

Hereinafter, an embodiment in which the user 1 possessing/holding the terminal device 100 enters the car 20 will be described with reference to FIG. 6.

For reference, the embodiment illustrated in FIG. 6 corresponds to the second embodiment in the light of recognition of the entry and identification of the security level.

Prior to the description, it is assumed that the communication device 25 (Bluetooth device) supporting Bluetooth and the security device 27 (starting device) are installed in the car 20.

When the security device, that is, the starting device 27 is unlocked in S30 (for example, using a car key), the communication device 25 (Bluetooth device) may identify the information that the starting device 27 is unlocked through a link to the starting device 27 in S31 and S32.

The car 20 is described below as the specific area. For the car 20, a connected car technology may be used in which the user 1 can remotely control car devices (including the starting device) through the terminal device 10 based on an Electronic Control Unit (ECU) linking to various car devices (for example, the communication device 25, an exhaust device, and a speed device) including the starting device 27.

In this case, the communication device 25 installed in the car 20 may identify the information that the starting device 27 is started and thus is unlocked through a direct link to the starting device 27 or an indirect link through the ECU.

Of course, even though the connected car technology is not used for the car 20, the communication device 25 installed in the car 20 may identify the information that the starting device 27 is started and thus is unlocked through the link to the starting device 27.

At this time, when the communication device 25 identifies the information that the starting device 27 is started and thus is unlocked, the communication device 25 may also identify whether the starting device 27 is unlocked by input of a password, by the use of a security key (for example, a car key), or recognition of a biometric information (for example, fingerprint or pupil).

Meanwhile, since the user 1 who unlocks the starting device 27 gets on the car 20 while holding the terminal device 100, short-range wireless communication (Bluetooth) is connected between the terminal device 100 and the communication device 25 in S33.

When the communication device 25 (Bluetooth device) installed in the car 20 identifies the information that the starting device 27 is unlocked, the communication device 25 may identify a terminal connected to short-range wireless communication (Bluetooth) within a preset time range from the time point of identification among terminals in a terminal list related to the corresponding specific area, that is, the car 20 and transmit the information that the security device, that is, the starting device 27 is unlocked to the terminal in S34 and S35.

At this time, it is preferable that the preset time range is set as a time required for mutually connecting the terminal device 100, which the user 1 who has unlocked the starting device 27 and entered the home 10 possesses/holds, and the communication device 25.

The terminal list related to the car 20 may include terminals which have been connected to the communication device 25 through Bluetooth.

Accordingly, terminals in the terminal list related to the car 20 are terminals of users authenticated as car-sharing members who get on the car 20.

When the communication device 25 (Bluetooth device) identifies the information that the starting device 27 is unlocked, the communication device 25 transmits the information that the starting device 27 is unlocked to a terminal connected to Bluetooth within a preset time range from the time point of identification among terminals of the car-sharing members in the terminal list related to the car 20.

At this time, it is preferable that a signal transmitted by the communication device 25 (Bluetooth device) includes information on whether the starting device 27 is unlocked by input of a password, by the use of a security key (for example, a car key), or recognition of a biometric information (for example, fingerprint or pupil).

When the terminal device 100 receives the information that the security device, that is, the starting device 27 located in (mapped to) the specific area, that is, the car 20 is unlocked from the communication device 25 (Bluetooth device) installed in the car 20, the terminal device 100 may recognize entry into the car 20 in S36.

When the entry into the car 20 is recognized, the terminal device 100 may identify a security level configured in a recognition scheme, which is identified when the entry into the car 20 is recognized, based on a security level for each recognition scheme pre-configured in each specific area in S37.

For example, with respect to the car 20, a relatively lower security level L is configured in the password/security key input recognition scheme and a relatively higher security level H may be configured in the biometric information recognition scheme.

As described above, when the terminal device 100 receives the information that the staring device 27 is unlocked from the communication device 25 and recognizes the entry into the car 20, the terminal device 100 may identify a recognition scheme by also receiving information on whether the starting device 17 is unlocked by input of a password, by the use of a security key, or by recognition of a biometric information.

Accordingly, when the entry into the car 20 is recognized, the terminal device 100 may identify the security level L when the recognition scheme, which is identified when the entry is recognized, is the password input or security key use recognition scheme and identify the security level H when the recognition scheme, which is identified when the entry is recognized, is the biometric information recognition scheme based on the security level for each recognition scheme pre-configured in each specific area in S37.

Hereinafter, it is assumed that the starting device is unlocked by the use of the car key in step S30 and the security level L is identified in step S37.

When the entry into the car 20 is recognized and the security level (for example L) is identified, the terminal device 100 executes an app of a site (service) pre-configured in the car 20 in S38.

Hereinafter, for convenience of description, it is assumed that an app of a traffic information service (site) (hereinafter, referred to as a traffic information app) is pre-configured in the car 20.

That is, when the entry into the car 20 is recognized and the security level (for example, L) is identified, the terminal device 100 executes the traffic information app of the traffic information service (site) pre-configured in the car 20 in S38.

Accordingly, the terminal device 100 may access the service device 40 (traffic information server) that provides the corresponding traffic information service (site) based on the traffic information app and automatically perform a function of the login to the traffic information service (site) in S39.

Then, the site device 40 (traffic information server) normally processes the login for the user 1 according to the login function automatically performed by the terminal device 100 in S40.

Accordingly, the terminal device 100 may access the corresponding traffic information site and use the traffic information service while being in the login state.

The description for the operation flow in the app service system according to various embodiments of the present disclosure has been completed and the operation flow of the terminal device according to an embodiment of the present disclosure will be subsequently described.

Figure 7:
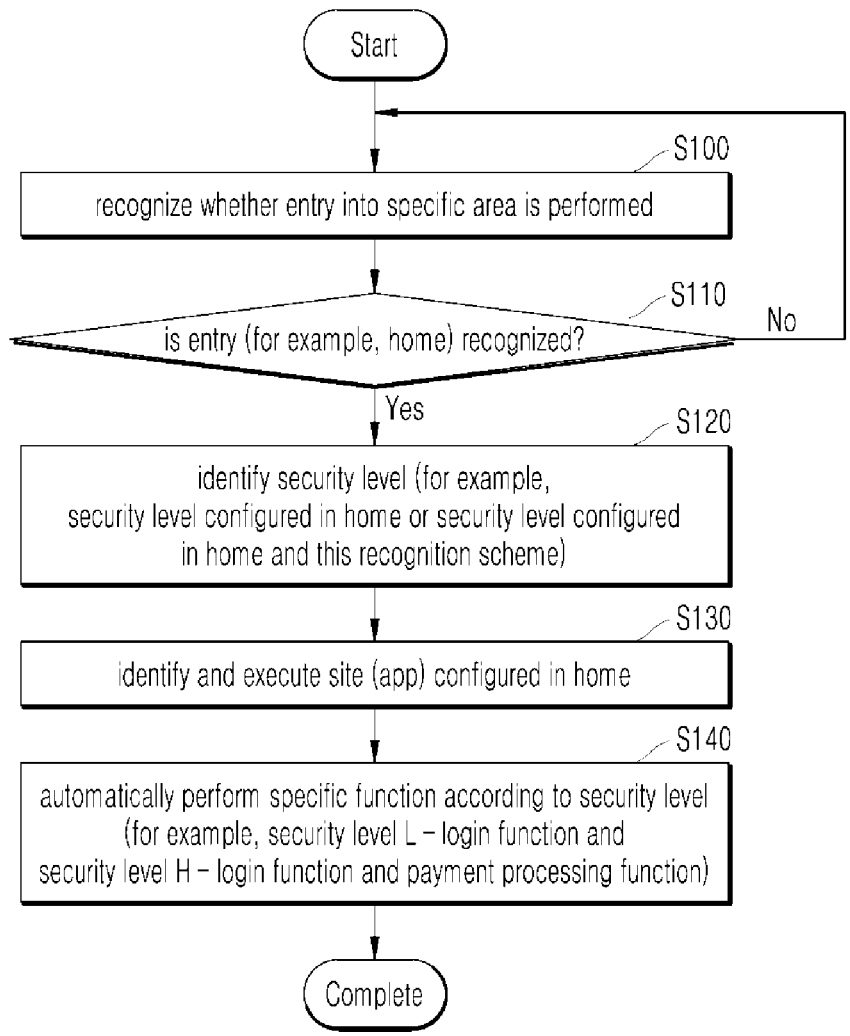
FIG. 7 is a flowchart schematically illustrating a method of operating the terminal device according to an embodiment of the present disclosure.

In connection with this, FIG. 7 illustrates the flow of a method of operating the terminal device 100 according to an embodiment of the present disclosure.

First, in the method of operating the terminal device 100 according to an embodiment of the present disclosure, the terminal device 100 recognizes whether the terminal device 100 enters a predetermined specific area in S100.

As described above, the home 10 and the car 20 will be described as examples of the specific area. In the method of operating the terminal device 100 according to an embodiment of the present disclosure, the terminal device 100 continues the operation of recognizing whether the terminal device 100 enters the home 10 or the car 20 in S100.

In the method of operating the terminal device 100 according to an embodiment of the present disclosure, when entry into the specific area, for example, the home 10 is recognized (Yes of S110), the terminal device 100 identifies a security level in S120.

The terminal device 100 may identify a security level configured in the home 10 according to the first embodiment, and may identify a security level configured in the home 10 and a recognition scheme when this entry is recognized according to the second embodiment in S120.

In the method of operating the terminal device 100 according to an embodiment of the present disclosure, when the entry into the home 10 is recognizes and the security level (for example, H or L) is identified, the terminal device 100 identifies and executes an app of the site pre-configured in the home 10 in S130 and automatically performs a specific function according to the security level in S140.

For example, the terminal device 100 may automatically perform a function of the login to a home-shopping service (site)/music-streaming service (site) by executing the installed app of the home-shopping service (site)/music-streaming service (site) pre-stored in the home 10 in S140.

At this time, when the security level is L, the terminal device 100 may automatically perform only the login function as the specific function.

Meanwhile, when the security level is H, the terminal device 100 may also automatically perform, as the specific function, a payment processing function when payment is performed in the home-shopping service (site)/music-streaming service (site) which the terminal device 100 logs in.

As described above, according to the present disclosure, when the user enters the safe area (for example, the home or the car), it is possible to derive an effect of improving the use of the app service in the terminal device while being free from the security problem by automatically performing the login to the site pre-configured in the entered area.

Further, according to the present disclosure, it is possible to derive a remarkable effect of maximizing the use of the app service in the terminal device by not only automatically performing the login to the site pre-configured in the entered area but also additionally differentiating functions in the site according to security levels.

The implementations of the functional operations and subject matter described in the present disclosure may be realized by a digital electronic circuit, by the structure described in the present disclosure and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A terminal device comprising:
a processor; and
a non-transitory computer readable storage medium configured to store at least one instruction that, when executed by the processor, causes the terminal device to:
recognize an entry of the terminal device into a specific area based on receiving a message from a communication device associated with the specific area, wherein the communication device forwards the message based on authenticating the terminal device for a short-range wireless communication with the communication device during a preset time range after a security device mapped to the specific area is unlocked, and wherein the preset time range corresponds to a time for a user of the terminal device to travel into the specific area after unlocking the security device and for the communication device and the terminal device to connect via the short-range wireless communication;
identify a security level of the terminal device in the specific area based on a particular security level for the specific area and information in the message from the communication device identifying a recognition scheme used by the security device mapped to the specific area to recognize the user of the terminal device; and
automatically perform a service when the identified security level satisfies a required security level.

2. The terminal device of claim 1, wherein the particular security level is pre-configured for the specific area based on whether the specific area is a home of the user.

3. The terminal device of claim 1, wherein the at least one instruction, when executed by the processor, further causes the terminal device to identify the security level of the terminal device in the specific area based on a security level configured for the recognition scheme used by the security device to recognize the user of the terminal device.

4. The terminal device of claim 3, wherein:
the recognition scheme used by the security device to recognize the user of the terminal device includes at least one of a password input recognition scheme, a key use recognition scheme, or a biometric information recognition scheme, and
a first security level of the biometric information recognition scheme is higher than a second security level of the key use recognition scheme and a third security level of the password input recognition scheme, and the second security level of the key use recognition scheme is equal to or higher than the third security level of the password input recognition scheme.

5. The terminal device of claim 1, wherein the at least one instruction, when executed by the processor, further causes the terminal device to:
automatically perform a login function to the service, and selectively perform a payment processing function according to the identified security level when payment is to be performed in the service.

6. A method of operating a terminal device, the method comprising:
recognizing an entry of the terminal device into a specific area based on receiving a message from a communication device associated with the specific area, wherein the communication device forwards the message based on authenticating the terminal device for a short-range wireless communication with the communication device during a preset time range after a security device mapped to the specific area is unlocked, and wherein the preset time range corresponds to a time for a user of the terminal device to travel into the specific area after unlocking the security device and for the communication device and the terminal device to connect via the short-range wireless communication;
identifying, based on recognizing the entry of the terminal device into the specific area, a security level of the terminal device in the specific area based on a preset security level associated with the specific area and information in the message from the communication device identifying a recognition scheme used by the security device mapped to the specific area to recognize the user of the terminal device; and
automatically executing, by the terminal device, a service preset in the specific area according to the identified security level.

7. The method of claim 6, wherein the recognition scheme used to recognize the user of the terminal device when the entry of the terminal device into the specific area is recognized includes at least one of a password input recognition scheme, a key use recognition scheme, or a biometric information recognition scheme, and
wherein the identifying of the security level of the terminal device in the specific area comprises:
identifying the security level of the terminal device in the specific area based on the at least one of the password input recognition scheme, the key use recognition scheme, or the biometric information recognition scheme used to recognize the user of the terminal device.

8. The method of claim 7, wherein:
a first security level of the biometric information recognition scheme is higher than a second security level of the key use recognition scheme and a third security level of the biometric information recognition scheme, and the second security level of the key use recognition scheme is equal to or higher than the third security level of the password input recognition scheme.

9. The method of claim 6, wherein the automatically executing of the service comprises:
automatically performing a login function of the service, and
selectively performing a payment processing function according to the identified security level when payment is to be performed in the service.

10. A method comprising:
determining when a user device is positioned at a particular location based on the user device receiving a message from another device associated with the particular location, wherein the other device forwards the message based on authenticating the user device for a short-range wireless communication with the other device during a preset time range after a security device mapped to the particular area unlocked, and wherein the preset time range corresponds to a time for a user of the user device to travel into the particular area after unlocking the security device and for the user device and the other device to connect via the short-range wireless communication;
assigning, by the user device, one of a first security level or a second security level to the user device positioned at a particular location based on a preset security level associated with the particular location and information included in the message identifying a recognition scheme used by the security device to recognize the user of the user device; and
performing, by the user device at the particular location, a function via the short-range wireless communication when the first security level is assigned to the user device, wherein the user device does not perform the function when the second security level is assigned to the user device.

11. The method of claim 10, wherein the particular location is preset to one of the first security level or the second security level, and the preset one of the first security level or the second security level is assigned to the user device when the user device is authenticated to communicate with the other device through the short-range wireless communication.

12. The method of claim 10, wherein:
the first security level is assigned to user device when the information in the message indicates that the security device is unlocked based on recognition of biometric information associated with the user, and
the second security level is assigned to user device when the information in the message indicates that the security device is unlocked without the recognition of biometric information associated with the user.

* * * * *